(12) United States Patent
Lajiness et al.

(10) Patent No.: US 11,582,412 B2
(45) Date of Patent: Feb. 14, 2023

(54) CAMERA AGNOSTIC CORE MONITOR INCORPORATING PROJECTED IMAGES WITH HIGH SPATIAL FREQUENCY

(71) Applicant: Rockwell Collins, Inc., Cedar Rapids, IA (US)

(72) Inventors: Gregory G. Lajiness, West Linn, OR (US); David I. Han, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 174 days.

(21) Appl. No.: 17/220,065

(22) Filed: Apr. 1, 2021

(65) Prior Publication Data

US 2022/0321807 A1 Oct. 6, 2022

(51) Int. Cl.
*H04N 5/359* (2011.01)
*H04N 5/235* (2006.01)
*H04N 5/341* (2011.01)

(52) U.S. Cl.
CPC ............ *H04N 5/359* (2013.01); *H04N 5/235* (2013.01); *H04N 5/341* (2013.01)

(58) Field of Classification Search
CPC ........ B64D 43/00; B64D 47/08; G01C 23/00; H04N 5/235; H04N 5/341; H04N 5/359
See application file for complete search history.

(56) References Cited

U.S. PATENT DOCUMENTS

| | | | |
|---|---|---|---|
| 8,193,478 B2 | 6/2012 | Pak et al. | |
| 8,275,213 B2 | 9/2012 | Richardson | |
| 8,547,456 B1 | 10/2013 | Zimmerman et al. | |
| 8,699,781 B1 | 4/2014 | Bold | |
| 9,681,124 B2 | 6/2017 | Moesle et al. | |
| 10,109,054 B1 | 10/2018 | Wilson et al. | |
| 10,490,111 B2 | 11/2019 | Mosier et al. | |
| 10,907,968 B1 | 2/2021 | Tiana et al. | |
| 11,215,834 B1* | 1/2022 | Marshall | G02B 27/0176 |
| 2009/0284552 A1* | 11/2009 | Larson | G06F 3/012 345/632 |
| 2009/0303082 A1* | 12/2009 | Larson | G06F 3/0481 340/945 |

(Continued)

FOREIGN PATENT DOCUMENTS

| | | |
|---|---|---|
| CN | 111683212 A | 9/2020 |
| KR | 1020160071386 A | 6/2016 |

OTHER PUBLICATIONS

Extended Search Report in European Application No. 22161147.8 dated Sep. 13, 2022, 8 pages.

*Primary Examiner* — Antoinette T Spinks
(74) *Attorney, Agent, or Firm* — Suiter Swantz pc llo

(57) ABSTRACT

A camera agnostic core monitor for an enhanced flight vision system (EFVS) is disclosed. In embodiments, a structured light projector (SLP) generates and projects a precise geometric pattern or other like artifact, which is reflected by collimating elements into the EFVS optical path. Within the optical path, the EFVS focal plane array is illuminated by, and detects, the projected artifacts within the scene imagery captured for display by the EFVS. Image processors assess the presentation of the detected artifacts (e.g., position/orientation relative to the expected presentation of the detected artifact within the scene imagery) to verify that the displayed EFVS imagery is not misleading.

17 Claims, 7 Drawing Sheets

(56) References Cited

U.S. PATENT DOCUMENTS

| 2012/0194418 A1 | 8/2012 | Osterhout et al. |
| 2014/0085324 A1 | 3/2014 | Charvet et al. |
| 2016/0343288 A1 | 11/2016 | Kim et al. |
| 2020/0259986 A1 | 8/2020 | Moholt |

* cited by examiner

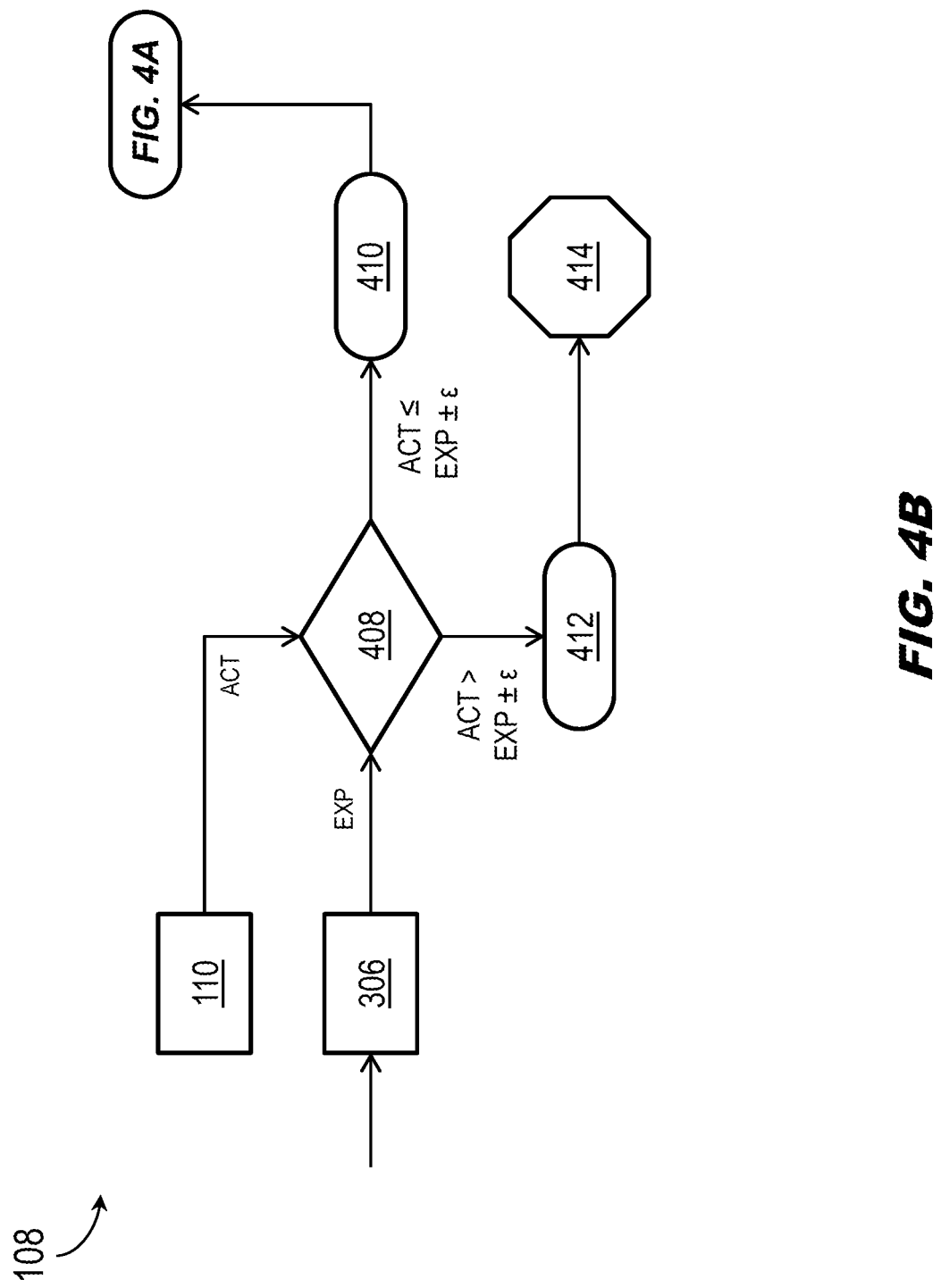

CAMERA AGNOSTIC CORE MONITOR INCORPORATING PROJECTED IMAGES WITH HIGH SPATIAL FREQUENCY

TECHNICAL FIELD

Embodiments of the inventive concepts disclosed herein are directed generally to avionics display systems and more particularly to monitoring systems for the said avionics display systems.

BACKGROUND

Enhanced flight vision systems (EFVS) provide electronic displays (e.g., cockpit-based primary flight displays (PFD)) of scene imagery and topography external to an aircraft (e.g., directly forward thereof) via electromagnetic image sensors of various wavelengths, e.g., infrared (IR) image sensors (which may include short-wave IR (SWIR) and/or near IR (NIR)); millimeter-wave radar and/or radiometry, low-light image intensifying, and other like imaging sensors). Displayed scene imagery may be enhanced by flight symbology for at-a-glance updates of flight parameters, aircraft information, and terrain details, providing a visual advantage in distance over pilots not using EFVS or in degraded visual environments (DVE).

As the information presented to the pilot via PFD is considered true unless flagged otherwise, EFVS must be designed and monitored to prevent the display of hazardously misleading information (HMI). HMI may include incorrect representation of aircraft parameters as terrain detail, "frozen" or "stuck" display systems providing information that is no longer temporally accurate, or any other presentation of inaccurate information that may create hazardous conditions for pilots, crew, and passengers.

Conventional core monitoring approaches mitigate the presentation of HMI by tracking intrinsic flaws in the EFVS focal point array (FPA). For example, manufacturing variations in pixel responsivity or vulnerability to cosmic radiation may manifest as dead pixels or fixed pattern noise (FPN). However, such camera-dependent approaches are less effective with respect to modern low-noise imaging sensors, which are less susceptible to dead pixels.

SUMMARY

In a first aspect, a camera agnostic core monitor for an enhanced flight vision system (EFVS) is disclosed. In embodiments, the core monitor includes structured light projectors (SLP) for emitting precise geometric patterns and like artifacts, the SLP powered by an internal voltage of the EFVS. Combiner elements reflect the generated artifacts into the EFVS optical path, where the EFVS focal plane array (FPA) captures scene imagery for the EFVS and detects the presented artifacts within the scene imagery. Image processors evaluate the detected artifacts to verify that the EFVS is not producing hazardously misleading imagery (HMI).

In embodiments, the presented artifacts are associated with an expected presentation. When the presentation of detected artifacts is evaluated as sufficiently deviant from their expected presentation, the core monitor declares a failure condition of the EFVS.

In some embodiments, a declared failure condition is associated with suppressing display of the EFVS scene imagery (which may be hazardously misleading).

In some embodiments, the expected presentation of artifacts includes an expected position and orientation relative to a centroid of the FPA, and evaluation of the presentation of a detected artifact may include the determination of an actual position and orientation of the artifact relative to the centroid, and a comparison of the actual presentation of the detected artifact to its expected presentation.

In some embodiments, a divergence of the actual presentation of a detected artifact from its expected presentation may involve one or more of a flipped artifact, a rotated artifact, and/or a displaced artifact compared to its expected presentation relative to the centroid of the FPA.

In some embodiments, the SLPs of the core monitor are associated with a source wavelength, and the EFVS FPA is configured for detection of the source wavelength at an acceptable response level.

In some embodiments, the presented artifact corresponds to a sequential arrangement of individual points.

In some embodiments, the EFVS FPA detects the presented artifact from within an unused portion of the scene imagery (e.g., an edge or periphery of the display), and the image processors evaluate the presentation of the artifact on a frame-by-frame basis.

In some embodiments, the EFVS FPA detects the presented artifact from within the image space of the scene imagery, and the image processors gate detected artifacts for subsequent or periodic evaluation.

In a further aspect, a method for camera agnostic core monitoring in an enhanced flight vision system (EFVS) is disclosed. In embodiments, the method includes capturing EFVS scene imagery via at least one focal plane array (FPA) in an optical path of the EFVS. The method includes emitting, via structured light projectors (SLP), one or more precise geometric patterns or like artifacts. The method includes reflecting the emitted artifacts into the optical path of the EFVS. The method includes detecting, via the EFVS FPA, the emitted artifacts within the scene imagery captured by the FPA. The method includes evaluating, via image processors of the EFVS, a presentation (e.g., position, orientation) of the detected artifacts to determine whether the EFVS is at risk of presenting hazardously misleading information (HMI).

In some embodiments, the method includes comparing the presentation of detected artifacts to their expected presentation and, when the actual presentation sufficiently deviates from the expected presentation, declaring a failure condition of the EFVS.

In some embodiments, the method includes, when a failure condition is declared, suppressing the display of EFVS scene imagery.

In some embodiments, the method includes evaluating the presentation of a detected artifact by determining a centroid of the FPA, determining an actual position and orientation of the detected artifact relative to the centroid, and comparing the actual position and orientation to an expected position and orientation of the artifact corresponding to an expected presentation of the artifact relative to the centroid.

In some embodiments, the method includes detecting the artifact within an unused portion or periphery of the scene imagery, and evaluating the presentation of the detected artifact on a frame-by-frame basis.

In some embodiments, the method includes detecting the artifact within the image space of the scene imagery, and gating the at least one detected artifact for subsequent or periodic evaluation.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 4A and 4B are block diagrams illustrating operations of the core monitoring system of FIG. 1;

DETAILED DESCRIPTION

Figure 1:
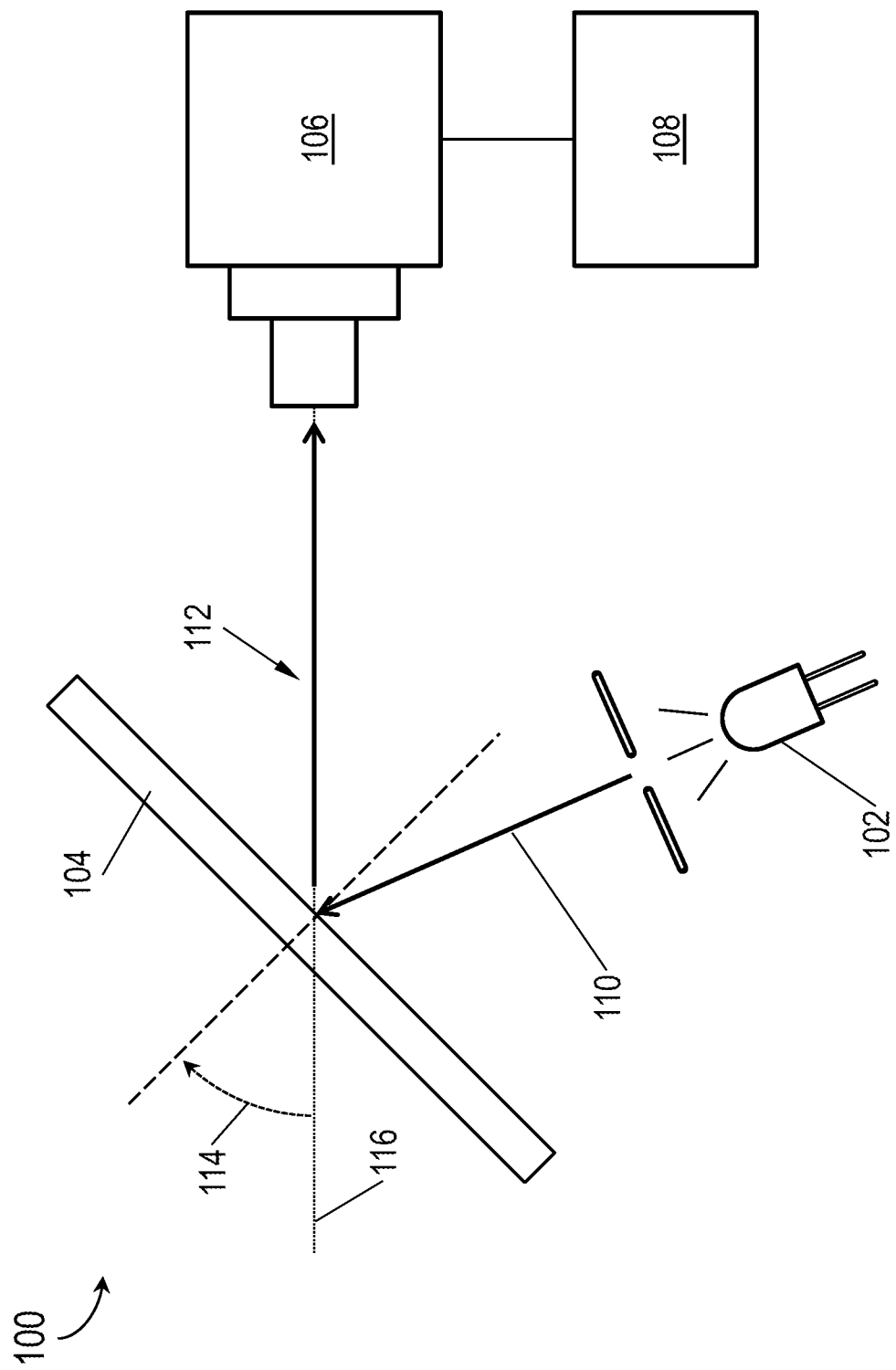
FIG. 1 is a diagrammatic illustration of a camera agnostic core monitoring system for an EFVS according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts herein are directed to a camera agnostic core monitoring system for enhanced flight vision systems (EFVS, EVS). The core monitoring system is camera agnostic in that it does not depend on intrinsic camera flaws to verify that an EVS display is not presenting hazardously misleading information (HMI). Next-generation EVS imaging systems, which drive toward higher resolutions and more consistent manufacturing methods, are less prone to such intrinsic flaws or variations, and thus conventional monitoring systems which rely on these flaws and variations may no longer be practical. The camera agnostic monitor instead relies on structured light projectors to insert precision patterns into the EVS image stream, which can be analyzed to detect frozen or flawed displays.

Referring to FIG. 1, a camera agnostic core monitor 100 for an EFVS is disclosed. The core monitor 100 may include a structured light projector 102 (SLP), combiner 104, focal plane array 106 (FPA; e.g., image sensor/s), and image processors 108.

In embodiments, the SLP 102 may be a compact artificial collimated light source powered by an internal voltage of the EFVS. For example, the SLP 102 may include, but is not limited to, one or more light emitting diodes (LED) or laser sources (e.g., an eye-safe laser configured for one or more specific operating wavelengths). The SLP 102 may generate an artifact 110 (e.g., a precise geometric pattern, which may comprise one or more continuous segments or an arrangement of individual dots, as described in greater detail below). In embodiments, the artifact 110 may be inserted into the optical path 112 of the EFVS by projecting the pattern toward a combiner 104 (e.g., a reflective collimator or window in the optical path). For example, the combiner 104 may be aligned (114) so as to allow the FPA 106 to capture EFVS scene imagery 116 and to reflect the projected artifact 110 into the optical path 112. In some embodiments, the optical path 112 may include additional lenses, collimators, or other like optical components.

In embodiments, the FPA 106 may include selected EFVS cameras or image sensors configured to capture EFVS scene imagery 116 and to detect within the scene imagery the artifact 110. For example, the FPA 106 may exhibit adequate response at one or more of the operating wavelengths of the SLP 102. Similarly, the FPA 106 may be configured for a sufficiently high resolution (e.g., M×N active pixels) to precisely and accurately resolve the artifact 110. Once detected by the FPA 106, the artifact 110 inserted into EFVS scene imagery 116 may be evaluated by the image processors 108 to determine whether the presentation of the artifacts is as expected (and if not, to what magnitude the actual artifacts deviate from expected results), and thereby evaluate whether the EFVS scene imagery presented to the user (e.g., via primary flight display (PFD) or other like EFVS display units) is hazardously misleading.

Figure 2:
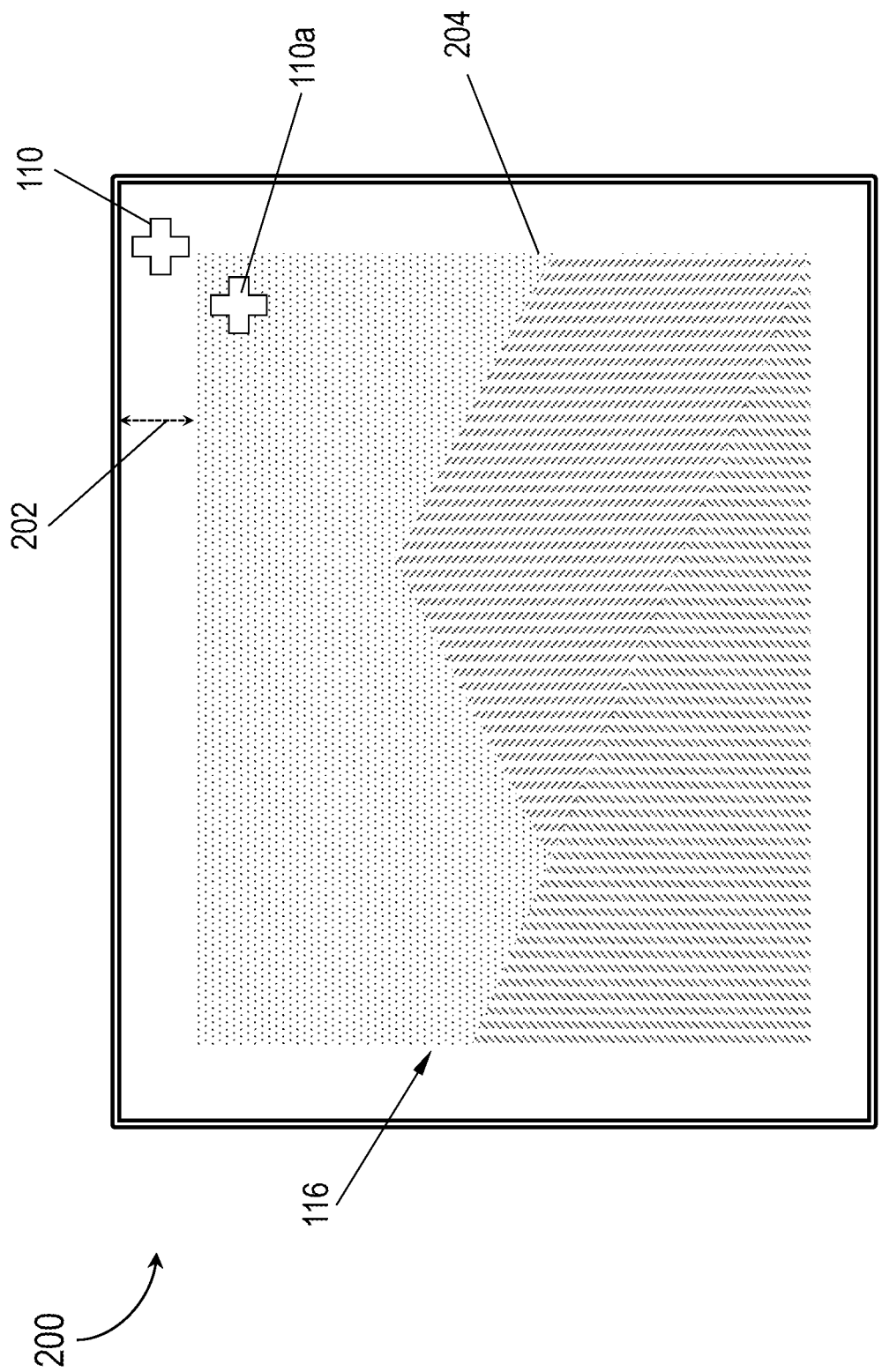
FIG. 2 is an illustration of an EFVS display demonstrating operations of the core monitoring system of FIG. 1.

Referring to FIG. 2, the EFVS FPA 106 is disclosed. The EFVS FPA 106 may include a primary flight display (PFD) or any like appropriate device for presenting the scene imagery 116 captured by the FPA along with any symbology added by the EFVS system.

In embodiments, the camera agnostic core monitoring system (100, FIG. 1) may project the artifact 110 within an unused portion 202 (e.g., unused pixels beyond the periphery of the image space 204) of the FPA 106. For example, when the artifact 110 is presented within the unused portion 202, the artifact may be presented on a continuous basis and the image processors (108, FIG. 1) may evaluate the scene imagery 116 on a frame-by-frame basis.

In some embodiments, the camera agnostic core monitor 100 may project the artifact (110a) within the image space 204. For example, if the artifact 110a is presented within the image space 204, the image processors 108 may temporarily gate one or more detected artifacts for subsequent processing (e.g., due to the increased difficulty in detecting the artifacts within the image space). In either case, the image processors 108 may evaluate the projected artifact 110, 110a at least once per second to verify that the scene imagery 116 presented by the FPA 106 is not hazardously misleading. In some embodiments, evaluations of the scene imagery 116 may be analyzed on a successive or a longer-term basis to determine whether or not the FPA 106 is frozen or stuck, e.g., no longer presenting current or temporally accurate scene imagery.

Figure 3A:
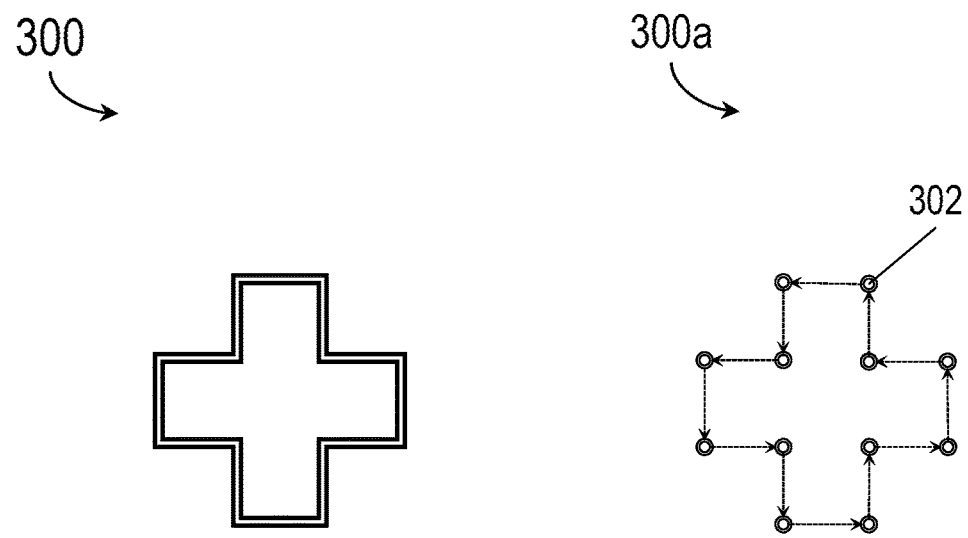
FIGS. 3A and 3B illustrate example artifacts generated, presented, and evaluated by the core monitoring system of FIG. 1.

Referring also to FIG. 3A, in embodiments the camera agnostic core monitor (100, FIG. 1) may generate and project the artifact (110, FIG. 2) as a continuous FIG. 300 or as a sequence 300a of individual points 302 comprising a figure and drawn in a predetermined order.

Figure 3B:
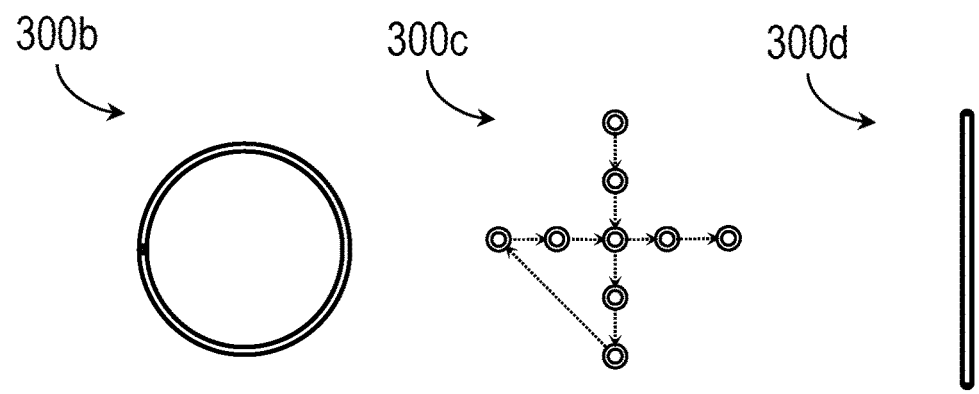

Referring also to FIG. 3B, projected artifacts may include, but are not limited to, circles 300b, crosses 300c, lines 300d, or any other appropriate open or closed figure.

Figure 3C:
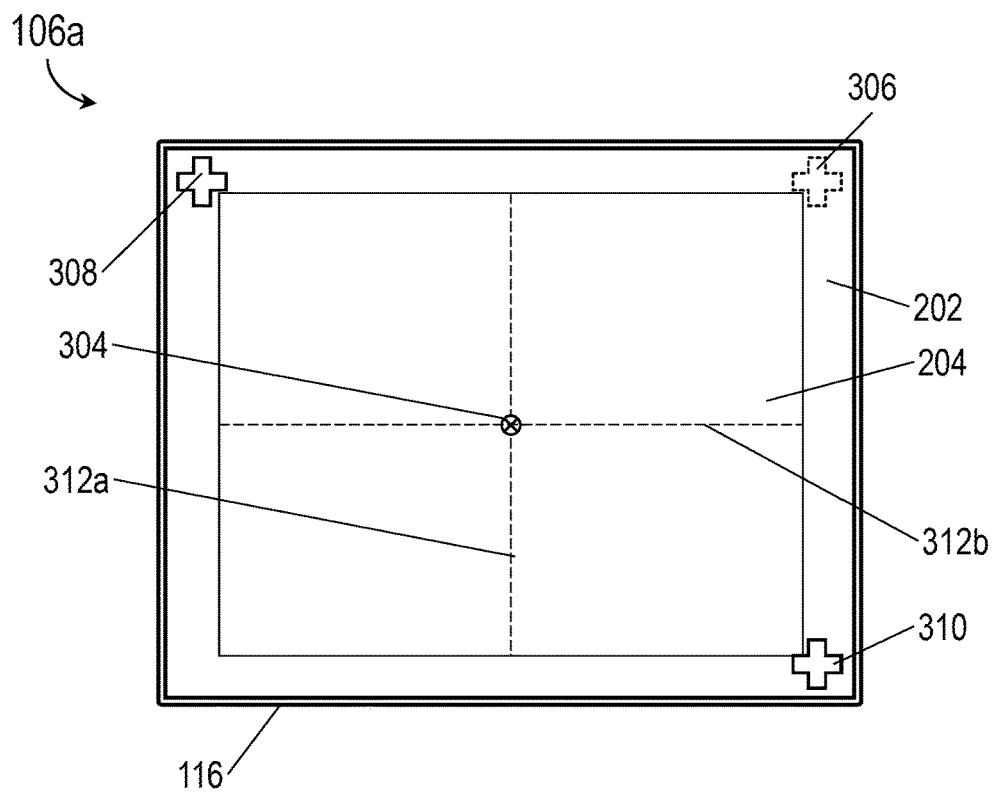
FIGS. 3C and 3D illustrate deviations of the EFVS focal plane array (FPA) as detected by divergent artifacts detected by the core monitoring system of FIG. 1.
Figure 3D:
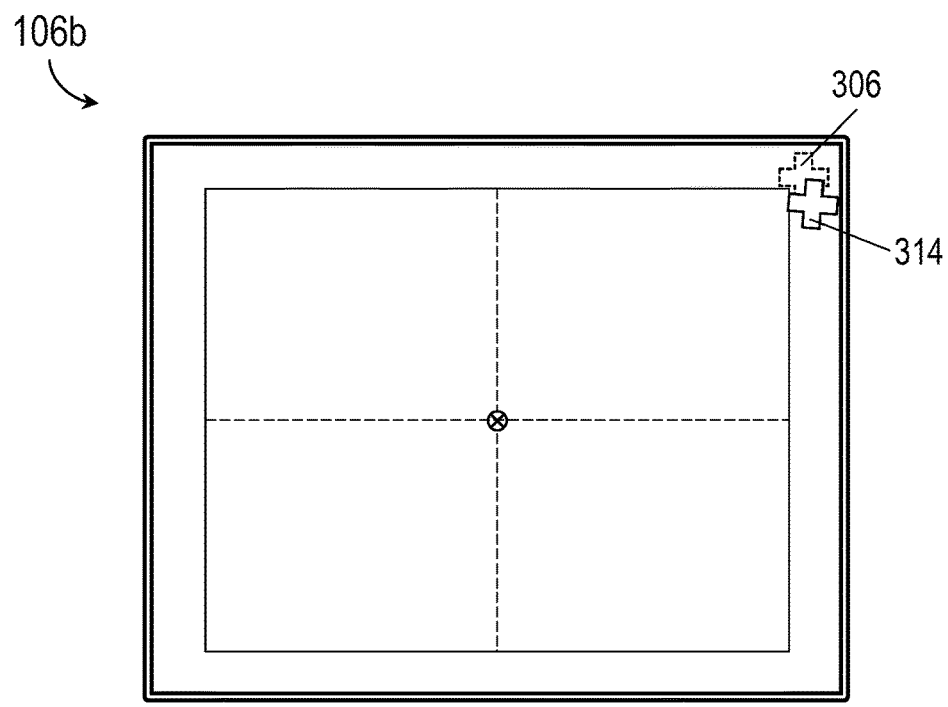

Referring also to FIGS. 3C and 3D, the EFVS FPAs 106a-b may be implemented and may function similarly to the EFVS FPA 106 of FIG. 2, except that the EFVS FPA 106a of FIG. 3C may reflect flipped artifacts, and the EFVS FPA 106b of FIG. 3D may reflect rotated artifacts, relative to the EFVS FPA 106.

In embodiments, the camera agnostic core monitor 100 may determine a centroid 304 of the scene imagery 116 and monitor the EFVS FPA 106a-b by determining the expected location and orientation of artifacts relative to the determined centroid. As artifacts 110 are placed within the unused portion 202 and/or the image space 204 of the scene imagery 116 and detected by the EFVS FPA 106a-b, the camera agnostic core monitor 100 may determine an actual position and orientation of each detected artifact and compare the actual position and orientation (e.g., relative to the centroid 304 of the EFVS FPA) to the expected position and orientation (306) for that artifact. For example, significant deviation of the position and orientation of any artifact from its expected position and orientation 306 may trigger a failure condition.

Referring in particular to FIG. 3C, in embodiments the EFVS FPA 106a may detect, relative to the centroid 304, a vertically flipped artifact 308 or a horizontally flipped artifact 310 in a position or orientation deviating from the expected position and orientation (306) of the artifact (e.g., respectively flipped relative to vertical or horizontal axes 312a, 312b). For example, the detection of the vertically or horizontally flipped artifacts 308, 310 may indicate that the EFVS FPA 106a is providing flipped visual information which may be hazardously misleading. As a result, the camera agnostic core monitor 100 may declare a failure condition.

Similarly, referring in particular to FIG. 3D, in embodiments the EFVS FPA 106b may detect, relative to the centroid 304, a rotated artifact 314. While the position and orientation of the rotated artifact 314 may not deviate as significantly from the expected position and orientation 306 as, for example, the vertically and horizontally flipped artifacts 308, 310 of FIG. 3C, the rotated artifact 314 may likewise indicate the presentation of hazardously misleading information by the EFVS FPA 106b. Accordingly, the camera agnostic core monitor 100 may similarly declare a failure condition.

Figure 4A:
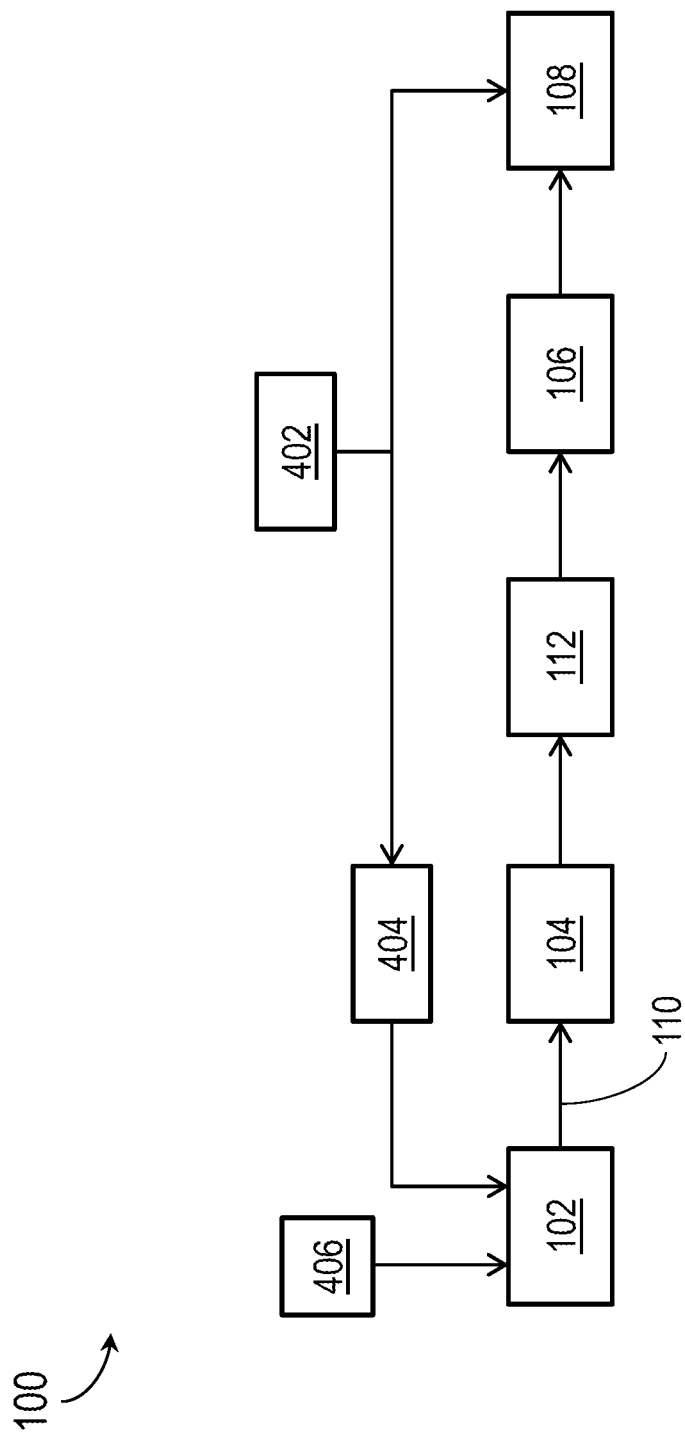

Referring now to FIG. 4A, the camera agnostic core monitor 100 is disclosed.

In embodiments, operations of the core monitor 100 may be triggered (402) on a frame-by-frame basis or periodically according to a predetermined interval (404) of at least once per second. For example, the SLP 102 powered by an internal voltage 406 may project one or more artifacts 110 into the combiner 104, which reflects the artifacts into the optical path 112 (e.g., and through any other lenses or optical components of the optical path) for presentation and detection by the EFVS FPA 106. The detected artifacts 110 may be evaluated by the image processors 108 for accuracy.

Referring also to FIG. 4B, operations of the image processors 108 are disclosed.

In embodiments, the image processors 108 may analyze detected artifacts (110; see also 110a, FIG. 1; 300, 300a-d; 308, 310, 314, FIGS. 3A-D) to compare (408) the position and orientation of each detected artifact to the expected position and orientation 306 of the artifact in its expected presentation. For example, if the actual position and orientation (ACT) of the artifact 110 and its expected position and orientation 306 (EXP) relative to the centroid 304 substantially correspond (e.g., the actual presentation of the artifact does not sufficiently deviate (c) from its expected presentation), the EFVS FPA (106, FIG. 1) may pass evaluation (410) and core monitoring may continue normally (as shown by, e.g., FIG. 4A). If, however, the actual presentation substantially deviates from the expected presentation (e.g., the deviation between the actual position and orientation (ACT) of the detected artifact and its expected position and orientation 306 (EXP) exceeds the predetermined threshold±ε, the camera agnostic core monitor 100 may declare a failure condition (412) and take appropriate action. For example, the camera agnostic core monitor 100 may alert the user to a failure condition of the EFVS, or the deviant/failed EFVS display may be blanked (414).

Figure 5:
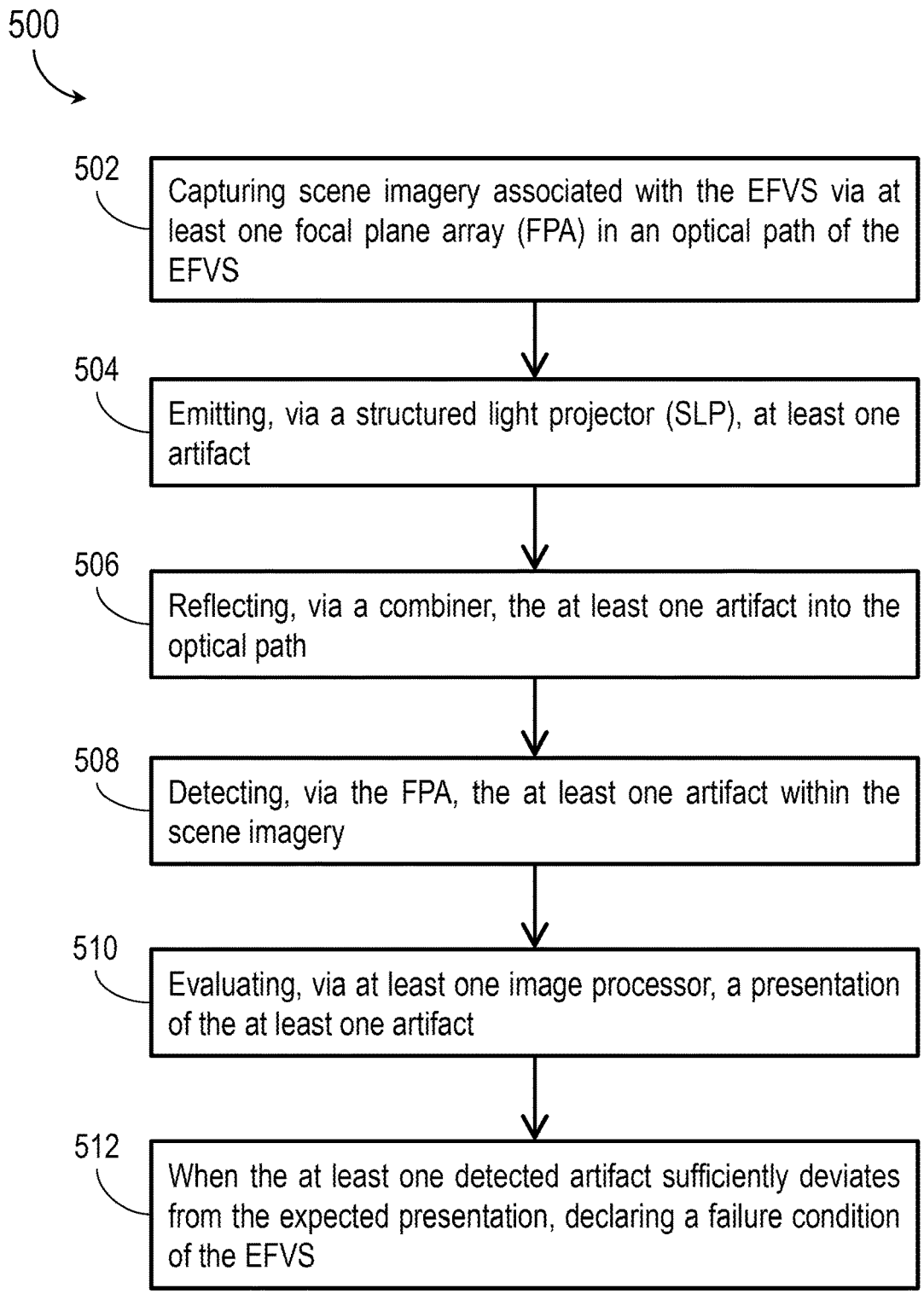
FIG. 5 is a flow diagram illustrating a method for camera agnostic core monitoring in an EFVS according to example embodiments of this disclosure.

Referring now to FIG. 5, the method 500 may be implemented by embodiments of the camera agnostic core monitor 100 and may include the following steps.

At a step 502, image sensors in the optical path of the EFVS capture scene imagery.

At a step 504, a structured light projector (SLP) generates and emits an artifact.

At a step 506, the artifact is reflected into the optical path of the EFVS via combiners.

At a step 508, the EFVS FPA detects the artifact within the captured scene imagery. For example, the artifact may be detected within a periphery or otherwise unused area of the FPA. In some embodiments, the artifact may be detected within the image space of the FPA. For example, detections of the artifact may be gated for periodic (e.g., instead of frame-by-frame) evaluation.

At a step 510, the image processors evaluate the orientation of the detected artifact. For example, the image processors may determine a centroid of the FPA, such that the expected presentation of the artifact corresponds to an expected position and expected orientation of the artifact relative to the centroid. The image processors determine the actual position and orientation of the detected artifact, comparing the actual position and orientation to the expected position and orientation of the artifact in its expected presentation.

The method 500 may include an additional step 512. At the step 512, when the presentation of the detected artifact sufficiently deviates from its expected presentation (e.g., the presentation of the detected artifact is sufficiently translated, flipped, rotated, and/or otherwise displaced relative to the determined centroid of the FPA), the core monitor may declare a failure condition of the EFVS. For example, upon declaration of a failure condition, the core monitor may alert the user or blank (e.g., suppress) the EFVS display.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A camera agnostic core monitor for an enhanced flight vision system (EFVS), comprising:
   a structured light projector (SLP) configured to project at least one artifact, the SLP powered by an internal voltage of the EFVS;
   at least one combiner configured to reflect the at least one artifact into an optical path of the EFVS;
   at least one focal plane array (FPA) in the optical path, the FPA configured to 1) capture scene imagery of the EFVS and 2) detect the at least one artifact from within the scene imagery;
   and
   at least one image processor in communication with the at least one FPA, the at least one image processor configured to evaluate a presentation of the at least one detected artifact.

2. The camera agnostic core monitor of claim 1, wherein:
   the at least one artifact is associated with at least one expected presentation;
   and
   the at least one image processor is configured, when the evaluated presentation sufficiently deviates from the expected presentation, to declare a failure condition of the EFVS.

3. The camera agnostic core monitor of claim 2, wherein:
   the at least one image processor is configured, when the failure condition is declared, to suppress display of the associated scene imagery.

4. The camera agnostic core monitor of claim 2, wherein:
   the expected presentation includes one or more of an expected position and an expected orientation relative to a centroid of the FPA;
   and
   the at least one image processor is configured to evaluate the presentation of the at least one detected artifact by:
   determining one or more of an actual position and an actual orientation of the at least one detected artifact relative to the centroid;
   and
   comparing the actual position and the actual orientation to the expected position and the expected orientation.

5. The camera agnostic core monitor of claim 4, wherein a deviation from the expected presentation of the evaluated presentation is associated with one or more of:
   a flip of the artifact relative to the expected presentation;
   a rotation of the artifact relative to the expected presentation;
   or
   a displacement of the artifact relative to the expected presentation.

6. The camera agnostic core monitor of claim 1, wherein:
   the at least one SLP is associated with at least one operating wavelength;
   and
   the at least one FPA is configured to detect the at least one operating wavelength at an acceptable response level.

7. The camera agnostic core monitor of claim 1, wherein: the at least one artifact comprises a sequence of points.

8. The camera agnostic core monitor of claim 1, wherein:
   the at least one FPA is configured to detect the at least one artifact from within at least one unused area of the scene imagery;
   and
   the at least one image processor is configured to evaluate the presentation of the at least one detected artifact for each frame of the scene imagery.

9. The camera agnostic core monitor of claim 1, wherein:
   the at least one FPA is configured to detect the at least one artifact from within at least one image space of the scene imagery;
   and
   the at least one image processor is configured to gate the at least one detected artifact for subsequent evaluation.

10. A method for camera agnostic core monitoring in an enhanced flight vision system (EFVS), the method comprising:
    capturing scene imagery associated with the EFVS via at least one focal plane array (FPA) in an optical path of the EFVS;
    emitting, via a structured light projector (SLP), at least one artifact;
    reflecting, via a combiner, the at least one artifact into the optical path;

detecting, via the FPA, the at least one artifact within the scene imagery;
and
evaluating, via at least one image processor, a presentation of the at least one detected artifact.

11. The method of claim 10, wherein:
evaluating the presentation of the at least one detected artifact includes comparing the detected artifact to at least one expected presentation of the artifact;
further comprising:
when the at least one detected artifact sufficiently deviates from the expected presentation, declaring a failure condition of the EFVS.

12. The method of claim 11, wherein:
declaring a failure condition of the EFVS includes suppressing the display of the associated scene imagery.

13. The method of claim 10, wherein evaluating the presentation of the at least one detected artifact includes:
determining a centroid of the FPA;
determining one or more of an actual position and an actual orientation of the at least one detected artifact relative to the centroid;
and
comparing the actual position and an actual orientation to one or more of an expected position and an expected orientation of the at least one artifact corresponding to the expected presentation.

14. The method of claim 10, wherein:
detecting, via the FPA, the at least one artifact within the scene imagery includes detecting the at least one artifact within an unused area of the scene imagery;
and
evaluating, via at least one image processor, a presentation of the at least one detected artifact includes evaluating the presentation of the at least one detected artifact for each frame of the scene imagery.

15. The method of claim 10, wherein:
detecting, via the FPA, the at least one artifact within the scene imagery includes detecting the at least one artifact within an image space of the scene imagery;
and
evaluating, via at least one image processor, a presentation of the at least one detected artifact includes gating the at least one detected artifact for subsequent evaluation.

16. The method of claim 11, wherein comparing the detected artifact to at least one expected presentation of the artifact includes detecting at least one of:
a flip of the artifact relative to the expected presentation;
a rotation of the artifact relative to the expected presentation;
or
a displacement of the artifact relative to the expected presentation.

17. The method of claim 10, wherein detecting, via the FPA, the at least one artifact within the scene imagery includes:
detecting at least one operating wavelength of the SLP at an acceptable response level.

* * * * *